United States Patent
Norris

(10) Patent No.: US 12,483,452 B2
(45) Date of Patent: Nov. 25, 2025

(54) PARAMETRIC SIGNAL PROCESSING SYSTEMS AND METHODS

(71) Applicant: Turtle Beach Corporation, San Diego, CA (US)

(72) Inventor: Elwood G. Norris, Poway, CA (US)

(73) Assignee: Turtle Beach Corporation, San Diego, CA (US)

( * ) Notice: Subject to any disclaimer, the term of this patent is extended or adjusted under 35 U.S.C. 154(b) by 149 days.

(21) Appl. No.: 18/318,497

(22) Filed: May 16, 2023

(65) Prior Publication Data

US 2023/0370312 A1    Nov. 16, 2023

Related U.S. Application Data

(60) Provisional application No. 63/342,445, filed on May 16, 2022.

(51) Int. Cl.
*H04L 27/04* (2006.01)
*H04B 11/00* (2006.01)

(52) U.S. Cl.
CPC .............. *H04L 27/04* (2013.01); *H04B 11/00* (2013.01)

(58) Field of Classification Search
CPC ..... H04L 27/04; H04B 11/00; H03F 2200/03; H03F 3/19; H04R 1/00; H04R 2217/03; H04R 3/00
USPC ................ 336/137; 381/4, 6, 77, 79, 120
See application file for complete search history.

(56) References Cited

U.S. PATENT DOCUMENTS

| | | | |
|---|---|---|---|
| 6,449,368 B1* | 9/2002 | Davis | H04S 1/002 381/1 |
| 8,027,488 B2* | 9/2011 | Pompei | H04R 3/12 381/112 |
| 9,596,529 B2* | 3/2017 | Kappus | H04R 1/00 |
| 2003/0091196 A1 | 5/2003 | Spencer | |
| 2003/0091203 A1* | 5/2003 | Croft, III | G10K 15/02 381/111 |
| 2005/0244016 A1* | 11/2005 | Norris | H04B 5/00 381/79 |
| 2014/0064509 A1* | 3/2014 | Su | G10L 21/02 381/73.1 |
| 2014/0355765 A1 | 12/2014 | Kulavik | |
| 2015/0256909 A1* | 9/2015 | Kappus | H03F 3/19 381/120 |
| 2022/0139403 A1* | 5/2022 | Tracey | H04S 5/00 381/17 |

* cited by examiner

*Primary Examiner* — Daniel L Murphy
*Assistant Examiner* — Amie M Ndure
(74) *Attorney, Agent, or Firm* — Sheppard Mullin Richter & Hampton LLP

(57) ABSTRACT

A method for generating a modulated carrier signal that can be emitted as a parametric wave includes measuring an average amplitude of an audio signal, and adjusting an average amplitude of a carrier signal based on the average amplitude of the audio signal. The carrier signal is then modulated with the audio signal to generate a modulated carrier signal. Various circuits, components and software are also provided for implementing the modulated carrier signal generation scheme.

19 Claims, 4 Drawing Sheets

CONVENTIONAL

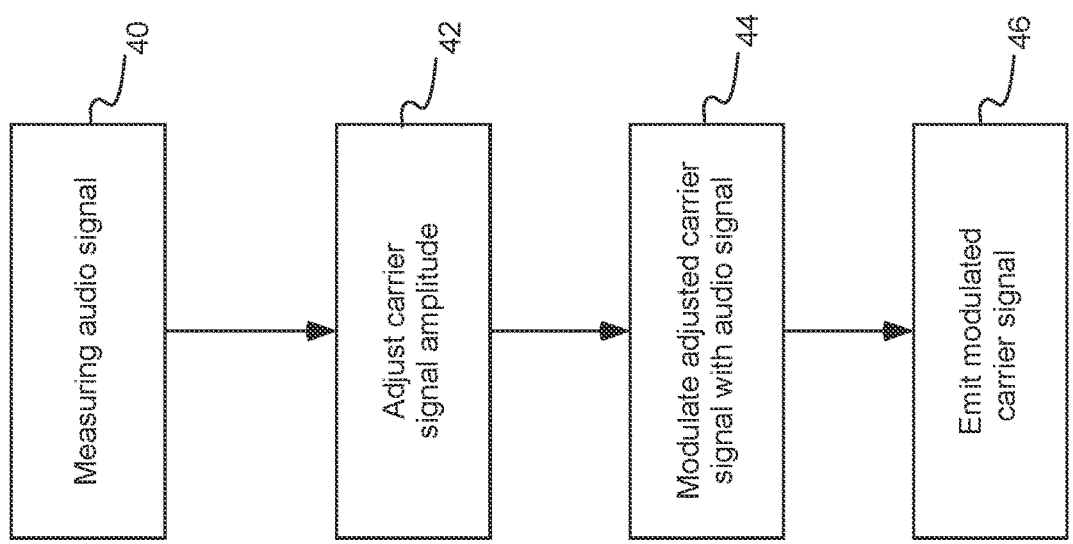

PARAMETRIC SIGNAL PROCESSING SYSTEMS AND METHODS

CROSS-REFERENCE TO RELATED APPLICATION

This application claims priority to U.S. Patent Application No. 63/342,445, filed May 16, 2022, entitled "IMPROVED PARAMETRIC SIGNAL PROCESSING SYSTEMS AND METHODS", which is hereby incorporated herein by reference in its entirety.

FIELD OF THE INVENTION

The present disclosure relates generally to the field of signal processing systems for use in audio reproduction.

RELATED ART

Non-linear transduction results from the introduction of sufficiently intense audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

While the theory of non-linear transduction has been addressed in numerous publications, commercial attempts to capitalize on this intriguing phenomenon have had some challenges. For example, the difference tone, if within the range of human hearing may be unwanted sound that interferes with reproduction of the original audio content.

SUMMARY OF THE INVENTION

In accordance with one aspect of the technology, a method is provided for generating a modulated carrier signal (e.g., an ultrasonic carrier signal) that can be emitted as a parametric wave. The method can include measuring an average amplitude of an audio signal, and adjusting an average amplitude of a carrier signal based on the average amplitude of the audio signal. The carrier signal can be modulated with the audio signal to generate a modulated carrier signal.

In accordance with another aspect of the technology, a system is provided for generating an ultrasonic carrier signal. The system can include an audio source, operable to provide an audio signal, and a measuring circuit, operable to measure an average amplitude of the audio signal. An amplitude modifying circuit can be provided and can be operable to modify an average amplitude of the ultrasonic carrier signal based on the measured average amplitude of the audio signal. A modulation circuit can be operable to modulate the modified carrier signal with the audio signal to generate a modulated carrier signal.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

FIG. 4 is a flowchart illustrating an exemplary manner of implementing the present technology.

Figure 1A:
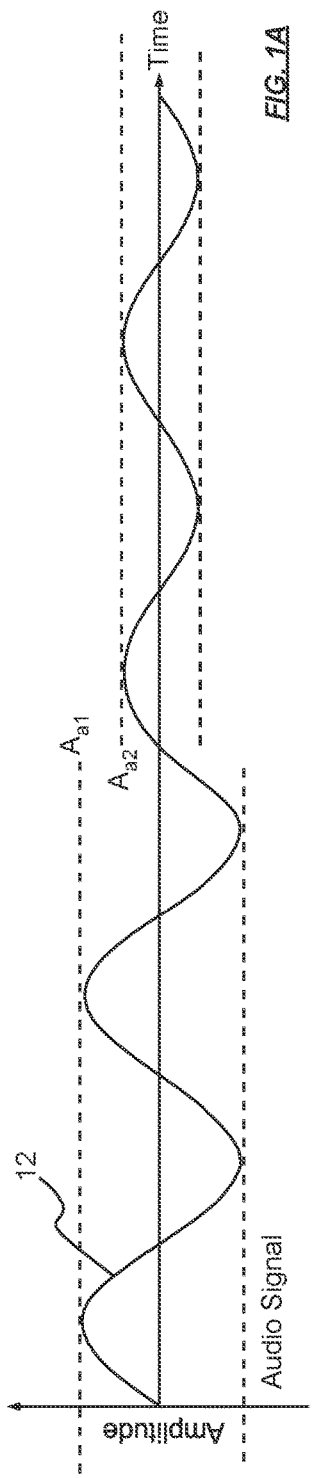
FIG. 1A is a representation of the amplitude of an exemplary audio signal over time in accordance with an aspect of the technology.

The drawings provided in many cases represent theoretical applications of the present technology, and do not always represent information derived from physical experiments. The information provided by the figures is presented to best describe the features of the present technology: as such, the figures may not be drawn to scale and may include simplifications, generalizations and/or discontinuities (or the lack thereof) not found in actual test data. The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Embodiments disclosed herein relate to improved signal processing systems for use in generating parametric audio signals. The systems described herein may be implemented to produce higher quality sound from parametric systems, vastly reducing or eliminating any unintended high-pitch squeal from being produced by the parametric system. This, in turn, may allow the use of a lower carrier signal frequency, which results in greater transmission distances. The present systems accomplish this by utilizing the masking effect of audio to reduce or eliminate the likelihood that a listener can hear any squeals produced by the parametric system.

In the early development efforts involving parametric sound systems, it was initially thought that utilizing a carrier wave of around 44 kHz (kilohertz) was optimal. However, this frequency of a carrier signal produced a subharmonic (f/4) at around 11 kHz, which resulted in some listeners detecting a high-pitched squeal that was not only annoying, but reportedly caused some listeners to feel ill. To eliminate this, the carrier frequency can be raised to a higher frequency, such as, e.g., on the order of 90 kHz. The f/4 subharmonic created with a 90 kHz carrier signal is on the order of 22 kHz, well beyond the human audible range. However, raising the carrier signal to such levels also reduces the range of the modulated signal.

The dependence of range on the frequency of an ultrasonic signal is an important consideration in ultrasonic applications. Generally, the range of an ultrasonic signal may refer to the maximum distance the signal can travel before its intensity becomes too attenuated, or weak, to be detected or used effectively. Ultrasonic signals experience attenuation as they propagate through the air, resulting in a decrease in signal intensity over distance traveled. As noted, attenuation is frequency-dependent, meaning that different frequencies are attenuated to varying extents. In general, higher-frequency ultrasonic signals tend to be more greatly attenuated than lower-frequency signals. This means that higher-frequency signals may have a shorter effective range compared to lower-frequency signals.

Additionally, higher-frequency signals are more prone to absorption, resulting in a reduction in range. Scattering occurs when ultrasonic waves encounter particles or irregularities in the medium, causing them to change direction. Scattering can also affect the range of ultrasonic signals, with higher-frequency signals being more susceptible to scattering effects. Also, Ultrasonic signals emitted by transducers typically exhibit beam spreading, where the beam of sound waves widens as it propagates. The extent of beam spreading is inversely proportional to the wavelength of the signal. Since wavelength is inversely proportional to frequency, higher-frequency signals experience more significant beam spreading compared to lower-frequency signals. As a result, higher-frequency signals may have a reduced effective range due to wider beam dispersion.

As a result of these factors, some of these conventional parametric emitters with a carrier frequency on the order of 90 kHz may produce an effective column of sound on the order of only a few feet in length.

Embodiments of the present technology may be implemented to address these limitations by recognizing the importance of the signal-to-noise ratio. In the event a high-frequency subharmonic is produced, this subharmonic is typically more detectable by humans when the amplitude of the original audio signal is low (i.e., the signal-to-noise ratio is low). At high audio amplitudes, any squeal produced by the system is masked at least partially by the higher audio—in other words, the signal-to-noise ratio is higher. Embodiments of the present technology alter the amplitude of the carrier signal based on the amplitude of the audio signal. When the audio signal is at low amplitudes, the carrier is reduced to lower amplitudes. When the audio signal is higher, the carrier amplitude can be increased. In this manner, any squeal produced is masked or undetectable at all amplitude ranges.

Figure 1B:
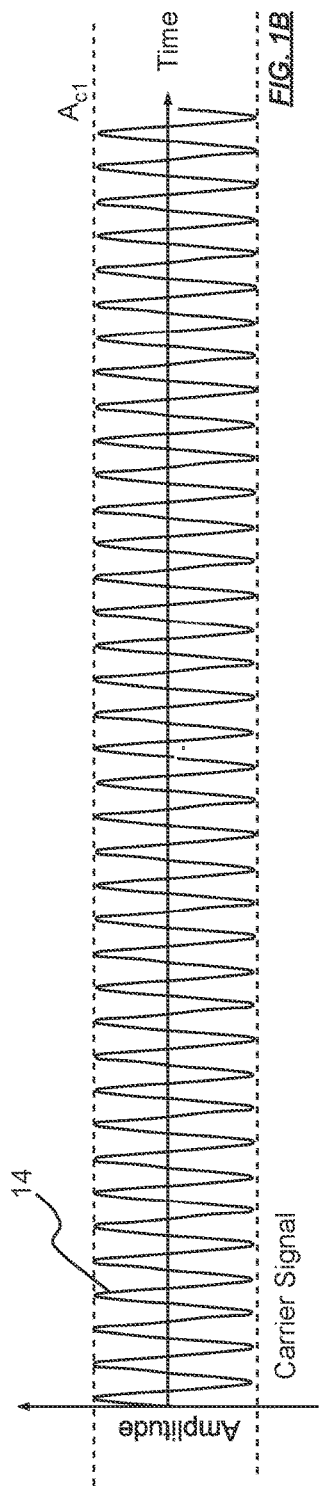
FIG. 1B is a representation of the amplitude of an exemplary carrier signal over time in accordance with conventional techniques.
Figure 1C:
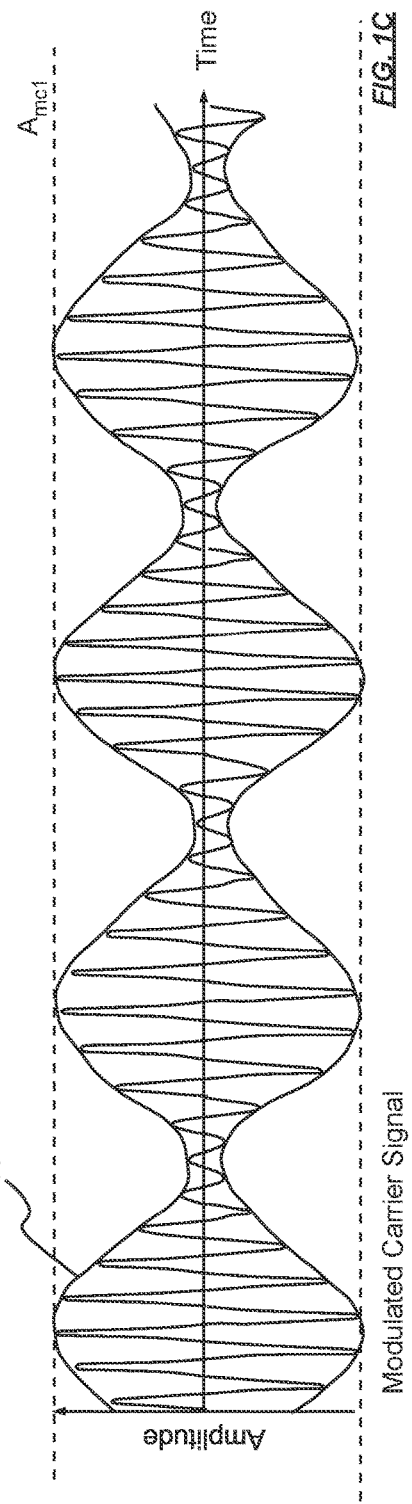
FIG. 1C is a representation of the amplitude of a modulated carrier signal over time, the carrier signal resulting from modulating the carrier signal of FIG. 1B with the audio signal of FIG. 1A in accordance with conventional techniques.

FIGS. 1A through 1C illustrate a conventional parametric modulation scheme. FIG. 1A illustrates an exemplary audio signal 12, shown theoretically having two basic stages: a first stage with an average amplitude of $A_{a1}$; and a second stage having average amplitude $A_{a2}$. FIG. 1B shows an exemplary carrier signal 14 used with conventional parametric systems, having a constant average amplitude $A_{c1}$. The resulting modulated carrier signal 16, shown in FIG. 1C, has a substantially constant average amplitude $A_{mc1}$.

As will be appreciated by those of ordinary skill in the art having possession of this disclosure, the average amplitude of the modulated carrier signal 16 shown in FIG. 1C remains substantially constant over time, even when the average amplitude of the audio signal drops to $A_{a2}$. During this time, as the audio is more faint, a listener is more likely to hear any squeal produced by the system in the range of human hearing.

Figure 2A:
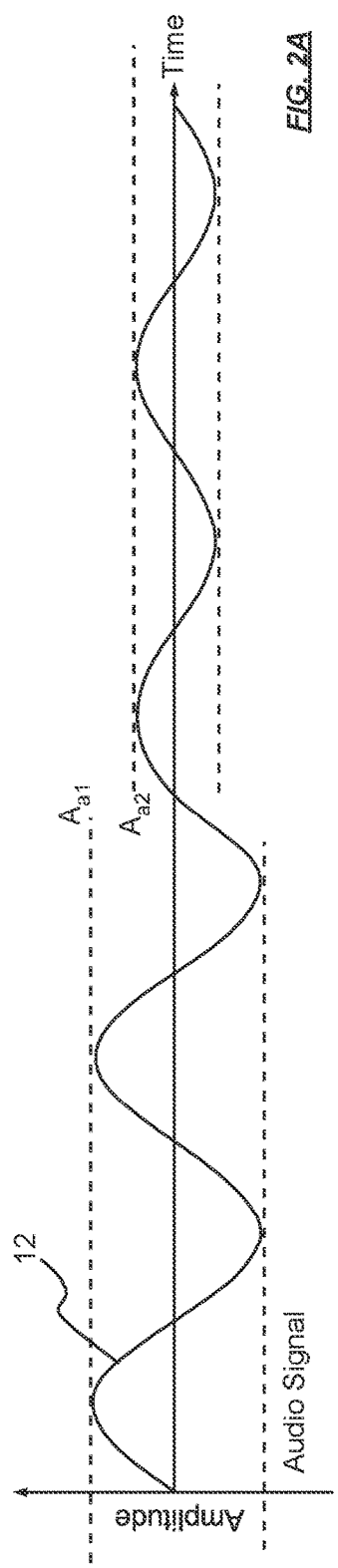
FIG. 2A is a representation of the amplitude of the exemplary audio signal of FIG. 1A over time in accordance with an aspect of the technology.
Figure 2B:
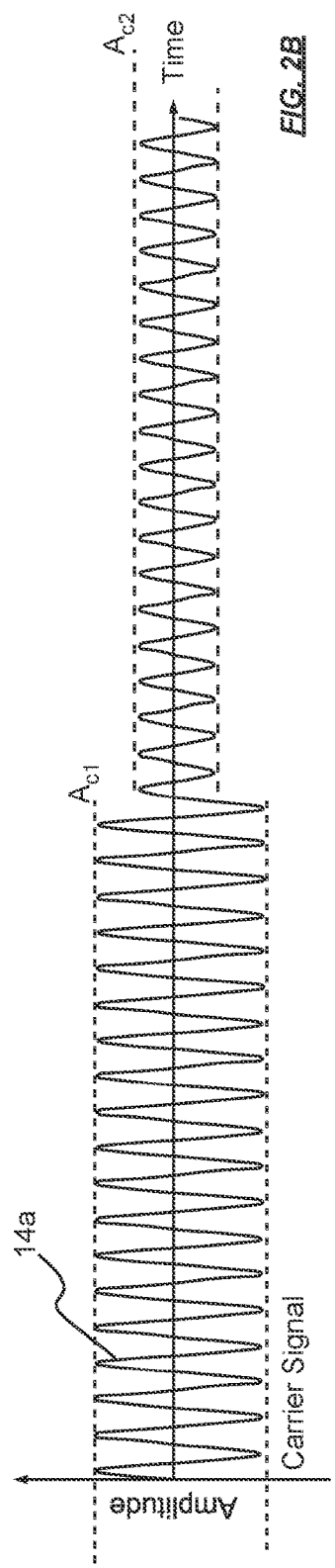
FIG. 2B is a representation of the amplitude of an exemplary carrier signal over time in accordance with the present technology.
Figure 2C:
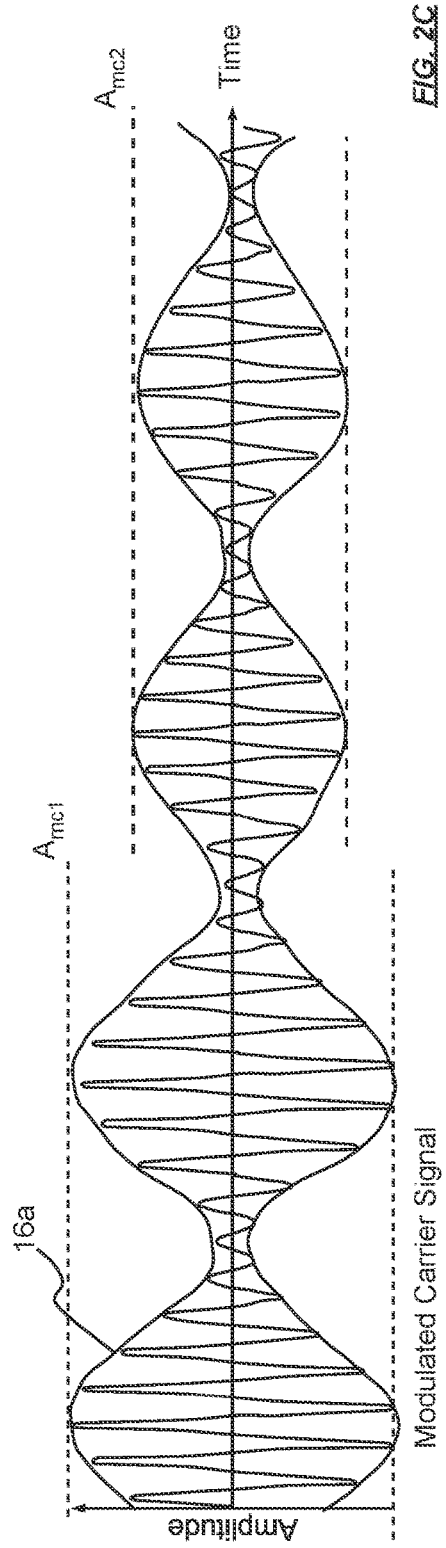
FIG. 2C is a representation of the amplitude of a modulated carrier signal over time, the carrier signal resulting from modulating the carrier signal of FIG. 2B with the audio signal of FIG. 2A in accordance with the present technology.

Embodiments of the present technology address this problem as shown in FIGS. 2A through 2C. The audio signal 12 represented in FIG. 2A is the same as that shown in FIG. 1A. In FIG. 2B, however, the present technology adjusts or modifies the amplitude of carrier signal 14a such that the average amplitude $A_{c2}$ of the carrier wave is reduced during the time in which the average audio amplitude $A_{a2}$ is reduced. Accordingly, during this time of faint audio, the modulated carrier is also faint. Thus, when a listener's ears are more attuned to faint sounds, the sound level of any potential squeal produced is also reduced.

Assuming that the system does produce a squeal due to relatively low carrier signal frequency (e.g., on the order of 40-44 kHz), when the average amplitude of the audio signal 12 is relatively high (e.g., that shown by $A_{a1}$ in FIG. 2A), the amplitude of the carrier signal 14a is allowed to remain relatively high (e.g., that shown by $A_{c1}$ in FIG. 2B), and any squeal is at least partially masked by the higher amplitude audio signal (i.e., the SNR is high). However, when the average amplitude of the audio signal 12 is relatively low (e.g., that shown by $A_{a2}$ in FIG. 2A), then the average amplitude of the carrier signal 14a is reduced (e.g., that shown by Act in FIG. 2B) to maintain an acceptable SNR. This allows the use of a relatively low carrier frequency to allow at least partial masking any resultant squeal. The present system thus maximizes the effective transmission distance of the emitter with a much higher quality listening experience.

The present technology can accomplish this in a variety of manners. Generally speaking, however, in some embodiments the audio signal can be delayed slightly and an average amplitude during that delay can be calculated. This measured average amplitude can then be used to adjust the amplitude of the carrier signal prior to modulation. The modified carrier signal can then be modulated with the audio signal. The amount of delay, and thus the amount of time over which the average can be calculated, can vary, and may depend on the application. Systems or applications in which the amplitude of the audio signal is expected to bury frequently may use a shorter period of delay to track changes in the amplitude more closely, while other systems or applications that may have a more constant amplitude over time may use a longer delay period or may sample the audio amplitude less frequently to determine any carrier adjustments. Adaptive systems may be implemented that can evaluate changes in audio at different time to determine how frequently to sample the audio amplitude for adjustments in carrier volume.

Figure 3:
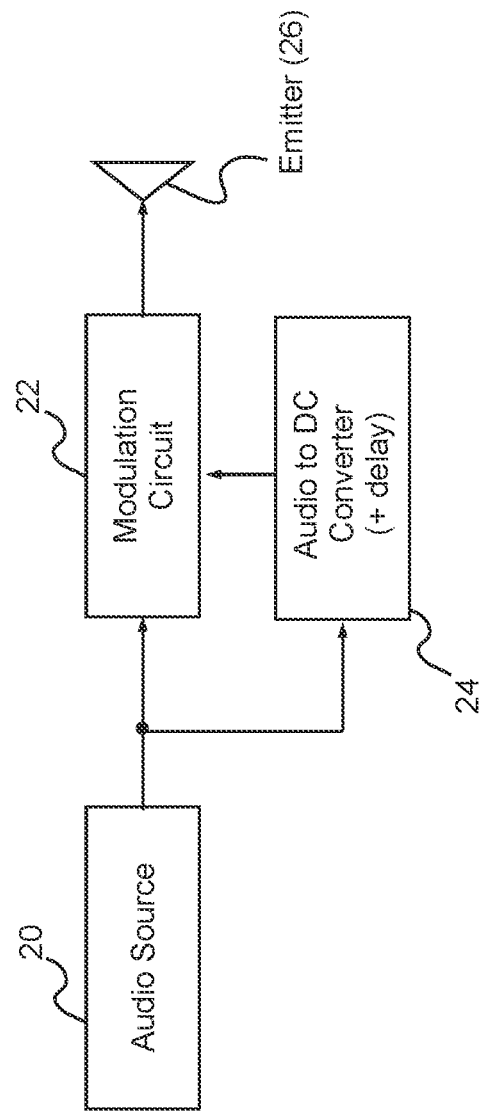
FIG. 3 is an exemplary circuit in accordance with an aspect of the technology.

FIG. 3 illustrates a simple circuit for sampling audio amplitude in accordance with one embodiment. In this example embodiment, the system can include an audio source 20 capable of producing the audio signal 12. An audio to DC converter 24 can sample the audio signal produced to determine an average audio signal amplitude. Audio-to-DC converter 24, sometimes referred to as an envelope detector or rectifier, is implement it to convert the audio signal into a direct current (DC) voltage.

Audio to DC converter 24 receives the audio signal from audio source 20 as its input, which is generally in the form of an electrical voltage waveform representing the audio. Audio to DC converter 24 inverts or discards the negative half cycles of the audio signal. The resulting signal is a series of positive half cycles. This rectification can be achieved using diodes or the like, for example. The rectified signal still contains rapid variations or ripples due to the original audio waveform. A capacitance may be used to smooth or filter the signal to obtain a steadier DC voltage. The capacitor charges during the positive half cycles and discharges slowly during the gaps between cycles, effectively smoothing the variations. The final output of the audio-to-DC converter 24 is a DC voltage that represents the envelope or amplitude information of the original audio signal.

Modulation circuit 22 receives a signal indicating the amplitude of the audio signal and uses this value to adjust the amplitude of the carrier signal 14a prior to modulating the adjusted carrier signal with the audio signal. Once modulated, the modulated carrier signal 16a can be provided to emitter 26 that emits the ultrasonic waveform as in conventional parametric audio systems.

In one example, the audio signal 12 can be sampled by the Audio to DC converter 24 (or an associated circuit) and an average audio signal amplitude can be calculated (e.g., every 1-2 seconds, although other time periods can be used). This average can then serve as the basis for adjusting the carrier signal. As this is a running average in some embodiments, the average amplitude of the carrier signal can be adjusted continuously prior to modulation with the audio signal. In this manner, as the amplitude of the audio goes up and down, so too does the amplitude of the carrier signal, modulation. Embodiments may be implemented where large swings in the average amplitude of the audio signal may be detected during the sampling period to determine whether the carrier amplitude should be adjusted more frequently.

FIG. 4 illustrates an exemplary method for generating a modulated carrier signal that can be emitted as a parametric wave in accordance with various embodiments. The method can include at 40 measuring an average amplitude of an audio signal. This can be done, for example, by measuring the amplitude of the peak of the audio signal waveform at various points in time and averaging these measurements, or by rectifying the signal and measuring the envelope. At 42, the method can include adjusting an average amplitude of a carrier signal based on the measured average amplitude of the audio signal. At 44, the method can include modulating the adjusted carrier signal with the audio signal to generate a modulated carrier signal. At 46, the modulated carrier signal can be emitted into a non-linear medium, such as air.

The method can include rectifying and/or time delaying the audio signal prior to adjusting the average amplitude of the carrier signal. The audio signal can be delayed between about 0.25 to about 1 second prior to modulating the carrier signal with the audio signal and the adjustment of the carrier signal can be synchronized with the delayed audio signal so that adjustments in carrier amplitude coincide with the corresponding portion of the audio waveform for which the average amplitude was calculated. The average amplitude of the audio signal can be measured over a period of 0.5 seconds, 1 second, 1.5 seconds, 2 seconds, 3 seconds, etc. The time period over which the audio signal can be averaged can vary depending upon the type of audio signal being processed. As noted above, some applications or some audio types may have more dynamic variation and require a more frequent adjustment.

In addition to the structural components described herein, the present technology also provides various methods of using, configuring, manufacturing and operating various components in various circumstances to achieve the results described herein.

As used herein, the singular forms "a" and "the" can include plural referents unless the context clearly dictates otherwise. Thus, for example, reference to "an emitter" can include one or more of such emitters.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

While the present invention has been described having varying components described in varying positions relative to the order in which an audio signal can be processed, in some embodiments of the invention, the order in which the audio signal is processed can significantly affect the performance of the systems. Thus, some (but not all), claimed embodiments are limited to the precise components recited, and can be limited to processing an audio signal in the precise step-wise order in which the components are claimed or shown. Similarly, some (but not all) of the methods claimed or described herein are limited to the precise step-wise order in which the process steps are recited.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

What is claimed is:

1. A method for generating a modulated carrier signal that can be emitted as a parametric wave, comprising:
    determining an average amplitude of an audio signal;
    adjusting an average amplitude of a carrier signal based on the average amplitude of the audio signal to create an adjusted carrier signal, wherein the average amplitude of the carrier signal increases as the average amplitude of the audio signal increases, and wherein the average amplitude of the carrier signal decreases as the average amplitude of the audio signal decreases; and
    modulating the adjusted carrier signal with the audio signal to generate a modulated carrier signal.

2. The method of claim 1, further comprising rectifying the audio signal prior to measuring the average amplitude of the audio signal.

3. The method of claim 1, further comprising delaying the audio signal prior to modulating the adjusted carrier signal with the audio signal.

4. The method of claim 3, wherein the audio signal is delayed between about 0.25 to about 1 second prior to modulating the adjusted carrier signal with the audio signal.

5. The method of claim 3, wherein the audio signal is delayed by an amount of time such that adjustments in amplitude of the adjusted carrier signal substantially coincide with a corresponding portion of an audio waveform for which the average amplitude used to create the adjusted carrier signal was determined.

6. The method of claim 1, wherein the average amplitude of the audio signal is measured over a period of about 0.5 seconds to about 3 seconds.

7. The method of claim 6, wherein the average amplitude of the audio signal is measured over a period of about 1 second to about 2 seconds.

8. The method of claim 6, wherein the average amplitude of the audio signal is measured over a period of about 1.5 seconds.

9. The method of claim 1, further comprising emitting the modulated carrier signal from an emitter.

10. A system for generating an ultrasonic signal, comprising:
    an audio source, operable to provide an audio signal;
    a measuring circuit, operable to measure an average amplitude of the audio signal;
    an amplitude modifying circuit, operable to modify an average amplitude of a carrier signal based on the measured average amplitude of the audio signal to create a modified carrier signal, wherein the average amplitude of the carrier signal increases as the average amplitude of the audio signal increases, and wherein the average amplitude of the carrier signal decreases as the average amplitude of the audio signal decreases; and
    a modulation circuit, operable to modulate the modified carrier signal with the audio signal to generate a modulated carrier signal.

11. The system of claim 10, wherein the measuring circuit includes an audio to DC converter.

12. The system of claim 10, wherein the measuring circuit includes a time delay component operable to delay the audio signal prior to modification of the carrier signal.

13. The system of claim 12, wherein the time delay component delays the audio signal between about 0.25 to about 1 second prior to modulating the modified carrier signal with the audio signal.

14. The system of claim 12, wherein the time delay component delays the audio signal by an amount of time such that adjustments in amplitude of the modified carrier signal substantially coincide with a corresponding portion of an audio waveform for which the average amplitude used to create the modified carrier signal was determined.

15. The system of claim 10, further comprising an ultrasonic emitter, operable to emit the modulated carrier signal into a non-linear medium.

16. The system of claim 10, wherein the measuring circuit measures the average amplitude of the audio signal over a period of about 0.5 seconds to about 3 seconds.

17. The system of claim 16, wherein the average amplitude of the audio signal is measured over a period of about 1 seconds to about 2 seconds.

18. The system of claim 16, wherein the average amplitude of the audio signal is measured over a period of about 1.5 seconds.

19. A method for generating a modulated carrier signal for an ultrasonic audio system, the method comprising:
    determining an average amplitude of an audio signal over a sampling period;
    adjusting an amplitude of a carrier signal based on the determined average amplitude of the audio signal to create an adjusted carrier signal, wherein the average amplitude of the carrier signal increases as the average amplitude of the audio signal increases, and wherein the average amplitude of the carrier signal decreases as the average amplitude of the audio signal decreases; and
    modulating the adjusted carrier signal with the audio signal to generate a modulated carrier signal.

* * * * *